United States Patent
Harman et al.

(10) Patent No.: US 9,656,308 B2
(45) Date of Patent: May 23, 2017

(54) SYSTEMS AND PROCESSES FOR CLEANING TANKER TRUCK INTERIORS

(71) Applicants: Robert Harman, Troutville, VA (US); Terry Bailey, Center, TX (US); Dewayne Jacobs, Shelbyville, TX (US); Justin White, McAlester, OK (US)

(72) Inventors: Robert Harman, Troutville, VA (US); Terry Bailey, Center, TX (US); Dewayne Jacobs, Shelbyville, TX (US); Justin White, McAlester, OK (US)

(73) Assignee: NGL Solids Solutions, LLC, Denver, CO (US)

( * ) Notice: Subject to any disclaimer, the term of this patent is extended or adjusted under 35 U.S.C. 154(b) by 0 days.

(21) Appl. No.: 14/796,006

(22) Filed: Jul. 10, 2015

(65) Prior Publication Data
US 2017/0008045 A1    Jan. 12, 2017

(51) Int. Cl.
*B08B 9/04*      (2006.01)
*B08B 9/093*    (2006.01)
(Continued)

(52) U.S. Cl.
CPC ................ *B08B 9/093* (2013.01); *B08B 3/02* (2013.01); *B08B 9/08* (2013.01); *B08B 9/0804* (2013.01);
(Continued)

(58) Field of Classification Search
CPC ....... B08B 9/08; B08B 9/0804; B08B 9/0813; B08B 9/093; B08B 9/0933; B08B 9/0936; B08B 3/02
See application file for complete search history.

(56) References Cited

U.S. PATENT DOCUMENTS

| 398,068 A | 2/1889 | McEwan |
|---|---|---|
| 1,693,885 A | 12/1928 | Butterworth |

(Continued)

FOREIGN PATENT DOCUMENTS

| CA | 2366079 | 6/2003 |
|---|---|---|
| CN | 2350522 | 11/1999 |

(Continued)

OTHER PUBLICATIONS

Co-Pending U.S. Appl. No. 14/796,043, filed Jul. 10, 2015.
Co-Pending U.S. Appl. No. 14/796,073, filed Jul. 10, 2015.
Co-Pending U.S. Appl. No. 15/214,550, filed Jul. 20, 2016.

*Primary Examiner* — Bibi Carrillo
(74) *Attorney, Agent, or Firm* — New River Valley IP Law, P.C.; Michele L. Mayberry; Timothy D. Nolan

(57) ABSTRACT

A system and process for cleaning a vessel is described. In embodiments, the system has one or more manway adapters configured to fit one or more manways of the vessel and deliver a cleaning solution through them. Further, in embodiments the system includes one or more actuators which are configured to position the one or more manway adapters horizontally or vertically to allow for optimal alignment and positioning of the manway adapters within the manways. Movement of the manway adapters may be facilitated by way of a frame assembly mounted on one or more horizontal rails. The system may be used to clean tanks and other vessels such as those that are on tanker trucks, tanker cars, or frac tanks.

16 Claims, 4 Drawing Sheets

(51) Int. Cl.
  *B08B 3/02* (2006.01)
  *B08B 9/08* (2006.01)
(52) U.S. Cl.
  CPC .......... *B08B 9/0813* (2013.01); *B08B 9/0933* (2013.01); *B08B 9/0936* (2013.01)

(56) References Cited

U.S. PATENT DOCUMENTS

| | | |
|---|---|---|
| 1,838,634 A | 12/1931 | Peterson et al. |
| 1,857,766 A | 5/1932 | Peterson |
| 2,116,935 A | 5/1938 | Richard et al. |
| 2,375,513 A | 5/1945 | Bach |
| 2,845,091 A | 7/1958 | Neer |
| 2,845,934 A | 8/1958 | Richard |
| 2,858,836 A | 11/1958 | Geh et al. |
| 3,002,468 A | 10/1961 | Williams |
| 3,022,792 A | 2/1962 | Perkins |
| 3,046,163 A | 7/1962 | Kearney et al. |
| 3,104,672 A | 9/1963 | Holdren |
| 3,394,761 A | 7/1968 | Jackson, Jr. et al. |
| 3,420,444 A | 1/1969 | Gunnar |
| 3,556,407 A | 1/1971 | Hiroshi et al. |
| 3,599,871 A | 8/1971 | Ruppel et al. |
| 3,645,452 A | 2/1972 | Stoeckel et al. |
| 3,741,808 A | 6/1973 | Stalker |
| 3,746,023 A | 7/1973 | Smith |
| 3,856,334 A | 12/1974 | Lange |
| 4,106,950 A | 8/1978 | Grismer |
| 4,144,901 A | 3/1979 | Stevenson |
| 4,207,965 A | 6/1980 | Chiang-Cheng et al. |
| 4,220,170 A | 9/1980 | Hebert et al. |
| 4,244,523 A | 1/1981 | Looper |
| 4,351,478 A | 9/1982 | Looper |
| 4,413,785 A | 11/1983 | Engelbert et al. |
| 4,453,864 A | 6/1984 | Beck et al. |
| 4,557,636 A | 12/1985 | Beck et al. |
| 4,574,825 A | 3/1986 | Haug |
| 4,660,678 A | 4/1987 | Krag |
| 4,668,358 A | 5/1987 | Ball |
| 4,672,710 A | 6/1987 | Urbani |
| 4,725,362 A | 2/1988 | Dugat |
| 4,751,887 A | 6/1988 | Terry et al. |
| 4,753,268 A | 6/1988 | Palau |
| 4,941,493 A | 7/1990 | Wieringa |
| 4,942,929 A | 7/1990 | Malachosky et al. |
| 4,957,188 A | 9/1990 | Bavis |
| 5,033,490 A | 7/1991 | Wade et al. |
| 5,048,775 A | 9/1991 | Hungerford |
| 5,058,612 A | 10/1991 | Winsted |
| 5,096,047 A | 3/1992 | Morikiyo et al. |
| 5,107,879 A | 4/1992 | Harvey |
| 5,109,933 A | 5/1992 | Jackson |
| 5,129,469 A | 7/1992 | Jackson |
| 5,195,548 A | 3/1993 | Roger |
| 5,226,749 A | 7/1993 | Perkins |
| 5,303,786 A | 4/1994 | Prestridge et al. |
| 5,337,966 A | 8/1994 | Francis et al. |
| 5,344,570 A | 9/1994 | McLachlan et al. |
| 5,352,298 A * | 10/1994 | Moulder ............ B60S 3/008 118/306 |
| 5,361,998 A | 11/1994 | Sirevag et al. |
| 5,402,857 A | 4/1995 | Dietzen |
| 5,405,223 A | 4/1995 | Sirevag |
| 5,419,496 A | 5/1995 | Novak |
| 5,421,903 A | 6/1995 | Manabe et al. |
| 5,431,236 A | 7/1995 | Warren |
| 5,454,662 A | 10/1995 | Skibitzke et al. |
| 5,518,553 A * | 5/1996 | Moulder ............ B60S 3/008 134/167 R |
| 5,526,562 A | 6/1996 | Kita et al. |
| 5,544,669 A | 8/1996 | Manabe et al. |
| 5,564,509 A | 10/1996 | Dietzen |
| 5,589,603 A | 12/1996 | Alexander et al. |
| 5,638,845 A | 6/1997 | Oliver et al. |
| 5,685,411 A | 11/1997 | Zimmerman et al. |
| 5,718,382 A * | 2/1998 | Jaeger ............... B08B 9/0936 239/227 |
| 5,720,310 A * | 2/1998 | Moulder ............ B05B 3/02 134/167 R |
| 5,734,988 A | 3/1998 | Alexander et al. |
| 5,740,821 A | 4/1998 | Arnold |
| 5,839,521 A | 11/1998 | Dietzen |
| 5,896,871 A | 4/1999 | Larsen |
| 5,961,438 A | 10/1999 | Ballantine et al. |
| 5,964,304 A | 10/1999 | Morrison et al. |
| 6,009,959 A | 1/2000 | Dietzen |
| 6,021,793 A * | 2/2000 | Moulder ............ B05B 3/02 134/167 R |
| 6,106,733 A | 8/2000 | Wood |
| 6,119,779 A | 9/2000 | Gipson et al. |
| 6,179,070 B1 | 1/2001 | Dietzen |
| 6,179,071 B1 | 1/2001 | Dietzen |
| 6,189,613 B1 | 2/2001 | Chachula et al. |
| 6,192,905 B1 | 2/2001 | Mincy et al. |
| 6,213,134 B1 | 4/2001 | Pike |
| 6,213,135 B1 * | 4/2001 | Moulder ............ B08B 9/0936 134/167 R |
| 6,213,227 B1 | 4/2001 | Dietzen |
| 6,321,754 B1 | 11/2001 | Manabe et al. |
| 6,321,860 B1 | 11/2001 | Reddoch |
| 6,345,672 B1 | 2/2002 | Dietzen |
| 6,378,791 B1 | 4/2002 | Perry et al. |
| 6,435,565 B2 | 8/2002 | Potts et al. |
| 6,488,314 B1 | 12/2002 | Hutter |
| 6,491,173 B1 | 12/2002 | Costa |
| 6,553,901 B2 | 4/2003 | Reddoch |
| 6,910,411 B2 | 6/2005 | Reddoch |
| 6,939,218 B1 | 9/2005 | Holland |
| 6,953,097 B2 | 10/2005 | Seyffert |
| 6,988,677 B2 | 1/2006 | Sodemann et al. |
| 7,089,949 B1 | 8/2006 | Rogerson et al. |
| 7,104,220 B1 | 9/2006 | Mack et al. |
| 7,108,143 B1 | 9/2006 | Lin |
| 7,261,109 B2 | 8/2007 | Luke et al. |
| 7,325,629 B2 | 2/2008 | Blaschke et al. |
| 7,455,066 B2 | 11/2008 | Feddema et al. |
| 7,523,570 B2 | 4/2009 | Pobihushchy |
| 7,575,072 B2 | 8/2009 | Reddoch |
| 7,717,474 B2 | 5/2010 | Gray |
| 7,798,218 B2 | 9/2010 | Garstad et al. |
| 7,857,077 B2 | 12/2010 | Reddoch |
| 7,905,683 B2 | 3/2011 | Kearney |
| 8,133,164 B2 | 3/2012 | Beebe et al. |
| 8,133,328 B2 | 3/2012 | Delaney et al. |
| 8,137,030 B2 | 3/2012 | Kearney |
| 8,316,557 B2 | 11/2012 | Burnett |
| 8,316,963 B2 | 11/2012 | Eia et al. |
| 8,398,034 B2 | 3/2013 | Lambert et al. |
| 8,424,784 B2 | 4/2013 | Munisteri |
| 8,464,971 B1 | 6/2013 | Munisteri |
| 8,533,974 B2 | 9/2013 | Burnett |
| 8,584,749 B2 | 11/2013 | Troshko et al. |
| 8,757,320 B2 | 6/2014 | Liao |
| 2002/0134554 A1 | 9/2002 | Schrenkel et al. |
| 2003/0192439 A1 | 10/2003 | Reddoch |
| 2003/0223850 A1 | 12/2003 | Hendriks et al. |
| 2005/0077299 A1 | 4/2005 | Cheng et al. |
| 2005/0199269 A1 | 9/2005 | Heil et al. |
| 2005/0229954 A1 | 10/2005 | Rosselott et al. |
| 2006/0065292 A1 | 3/2006 | Moore |
| 2007/0120665 A1 * | 5/2007 | Martin ............... B60P 3/226 340/545.1 |
| 2008/0083566 A1 | 4/2008 | Burnett |
| 2008/0129039 A1 | 6/2008 | Gray |
| 2009/0078647 A1 | 3/2009 | Frazier et al. |
| 2010/0025497 A1 | 2/2010 | Ellenbecker |
| 2010/0040439 A1 | 2/2010 | Temple et al. |
| 2010/0154828 A1 | 6/2010 | Green |
| 2011/0047743 A1 | 3/2011 | Shepherd |
| 2011/0114138 A1 | 5/2011 | Bastuji et al. |
| 2011/0246162 A1 | 10/2011 | Brown et al. |
| 2011/0284031 A1 | 11/2011 | Green |
| 2012/0000495 A1 | 1/2012 | Schmit et al. |

(56) References Cited

U.S. PATENT DOCUMENTS

| | | | |
|---|---|---|---|
| 2012/0260945 A1* | 10/2012 | Kim | H01L 21/67017 134/18 |
| 2013/0057132 A1 | 3/2013 | Flowers et al. | |
| 2013/0067762 A1 | 3/2013 | Burnett | |
| 2013/0160989 A1 | 6/2013 | Durden | |
| 2013/0213674 A1 | 8/2013 | Williams et al. | |
| 2013/0247939 A1 | 9/2013 | Chanthavongsy et al. | |
| 2014/0190517 A1 | 7/2014 | Fallon et al. | |

FOREIGN PATENT DOCUMENTS

| | | |
|---|---|---|
| CN | 201125043 | 10/2008 |
| CN | 201711322 U | 1/2011 |
| CN | 201728211 U | 2/2011 |
| CN | 202162184 U | 3/2012 |
| CN | 202199558 U | 4/2012 |
| EP | 0041855 A1 | 12/1981 |
| EP | 1437184 B1 | 8/2012 |
| EP | 1686883 B1 | 11/2012 |
| EP | 2512958 B1 | 5/2013 |
| KR | 20040037631 A | 5/2004 |
| WO | 9116150 A1 | 10/1991 |
| WO | 9318864 A1 | 9/1993 |
| WO | 9417922 A1 | 8/1994 |
| WO | 9514543 A1 | 6/1995 |
| WO | 9522415 A1 | 8/1995 |
| WO | 9700142 A1 | 1/1997 |
| WO | 9816717 A1 | 4/1998 |
| WO | 9904134 A1 | 1/1999 |
| WO | 0205682 A2 | 1/2002 |
| WO | 0244515 A1 | 6/2002 |
| WO | 03059540 A1 | 7/2003 |
| WO | 2008041020 A1 | 4/2008 |
| WO | 2008113070 A2 | 9/2008 |
| WO | 2010143060 A1 | 12/2010 |
| WO | 2012005889 A1 | 1/2012 |
| WO | 2012082216 A1 | 6/2012 |
| WO | 2013048252 A2 | 4/2013 |
| WO | 2014023476 A1 | 2/2014 |

* cited by examiner

SYSTEMS AND PROCESSES FOR CLEANING TANKER TRUCK INTERIORS

BACKGROUND OF THE INVENTION

Field of the Invention

The present invention relates to systems and processes for cleaning a vessel. More particularly, in embodiments the present invention relates to a system for cleaning a vessel which controls the position of one or more manway adapters equipped with a washout nozzle. Further, in embodiments the system is configured to allow for machine control of the one or more manway adapters so that they may be positioned horizontally or vertically to allow for alignment and placement of the manway adapter within the manway of the vessel.

Description of Related Art

Tanker trucks haul oilfield fluids such as crude oil, oil- or water-based drilling mud, and liquefied solid wastes. Existing processes for cleaning the interior of trucks are often manual, requiring extensive labor and possibly confined spaced entry. Alternatively, equipment and devices that access the manways of tanker trucks to clean their interiors have been developed. However, there is a dearth of systems for machine operation and alignment of this equipment. Thus, there is a need in the art for improved systems and processes for cleaning tanker trucks and other vessels.

SUMMARY OF THE INVENTION

Disclosed herein are systems and methods for cleaning a vessel. The systems described herein overcome the shortcomings of existing cleaning systems, such as those disclosed in U.S. Pat. Nos. 7,104,220; 6,213,134; 5,740,821; 5,107,879; 3,046,163; 2,845,934; 1,857,766; and 1,838,634; as well as in International Patent Application Publication Nos. WO 1991/016150 and WO 2013/048252. In particular, the systems described herein are capable of aligning a manyway adapter and corresponding washing apparatus (e.g., a washout nozzle) with a manway. The alignment is achieved by coupling the manway adapter to a structure slideably engaged within a series of tracks or rails. Moreover, in addition to alignment between the manway adapter and manway, the systems described herein further provide for extension of the manway adapter into the manway of the vessel.

An advantage of systems described herein include a "one-size-fits-all" cleaning system. It is envisioned that the systems described herein will be capable of cleaning any vessel regardless of the dimensions of the vessel to be cleaned. The horizontal and vertical movements provided by the systems described herein will permit alignment between the manway adapter and the manway of a variety of different sized vessels while further permitting extension of the manway adapter into the manway of the vessel for thorough cleaning.

The systems and methods provided herein will reduce the number of resources needed to clean these vessels, including a reduction in actual man-hours, and improve the efficiency of the cleaning process.

As discussed herein, embodiments of the invention provide for a machine-controlled system for cleaning a vessel. The system may comprise one or more horizontal rails and one or more basket or frame assemblies configured for moveable engagement with each rail. The system may further comprise one or more manway adapters configured to fit in a vessel manway and deliver a cleaning solution to one or more interior surfaces of the vessel. Each manway adapter may be operably connected to a frame assembly and a washout nozzle. The systems may comprise a first actuator operably configured for positioning a manway adapter horizontally along each rail and a second actuator operably configured for positioning a manway adapter vertically.

In embodiments, the one or more manway adapters may be each operably connected to a frame assembly through the second actuator, and the first actuator may position the manway adapter horizontally through movement of the frame assembly. Further, the one or more frame assemblies may each comprise a square, rectangular, or box-shaped first frame and a trapezoidal second frame disposed on top of the first frame. Further, the sides of the square, rectangular, or box-shaped first frame may be configured to slideably engage with the horizontal rails such that a portion of the first frame and the entire second frame extend above the horizontal rails. The one or more frame assemblies may slideably engage with each rail through wheels or casters. Additionally, the top of the second frame may comprise slanting supports connected to the second actuator. The first or second actuator may be hydraulic, electric, or pneumatic actuators. The first actuator may be a rotary actuator and the second actuator may be a hydraulic cylinder.

In embodiments, each manway adapter may comprise a cone-shaped base having a top surface and bottom surface such that the diameter of the top surface exceeds that of the bottom surface and a tapered side portion extends from the top surface to the bottom surface. Each manway adapter may also comprise a solution feeding pipe which passes through the top surface and the bottom surface of the cone shaped base in an axial direction. The washout nozzle may terminate at the end of the solution feeding pipe. Further, the washout nozzle may be water-powered and comprise one or more spouts disposed equilaterally. The washout nozzle may rotate and spin in such a manner that it delivers a cleaning solution to multiple interior surfaces of the tanker in a 360° spray pattern. Further, each manway adapter may further comprise one or more of a vent tube disposed through the cone-shaped base in parallel with solution feeding pipe, a splash plate surrounding solution feeding pipe and in parallel with bottom surface, an elbow portion extending at top of solution feeding pipe, and a grab handle extending through the elbow portion. Still further, the solution feeding pipe may be assembled from down pipe connected with National Pipe Tapered Thread.

In embodiments, the vessel may be a tank, and the tank may be a component of a tanker truck, tanker car of a train, or other vessels of similar structure. Further, in embodiments, a support structure may support the one or more horizontal rails. The support structure may be overhead mounted or post mounted.

Additional embodiments provide for a process for cleaning a vessel. The process may comprise providing a vessel having one or more manways on top of the vessel, providing one or more manway adapters each equipped with a washout nozzle, providing a first actuator and a second actuator, controlling horizontal movement of at least one of the manway adapters with the first actuator and vertical movement of the manway adapter with the second actuator to align the manway adapter within one of the manways, and delivering a cleaning solution through the washout nozzle. The first actuator may control horizontal movement of the manway adapter along a set of rails. Further, the manway adapter may be operably connected to a frame assembly, and the first actuator may control horizontal movement of the manway adapter through movement of the frame assembly along the rails. Still further, the manway adapter may be operably connected to the frame assembly through the second actuator. The first actuator may be a rotary actuator and the second actuator may be a hydraulic cylinder. The vessel may be a tank such as a component of a tanker truck, tanker car, or other vessels of similar structure, and the tank may contain an oilfield fluid.

In other embodiments, the process may also comprise providing the system of the invention, providing a vessel having one or more manways at the top of the vessel, actuating the first actuator to position the one or more manway adapters horizontally to align with each of the manways, actuating the second actuator to position the one or more manway adapters vertically within the manways, and delivering a cleaning solution through the one or more manway adapters to the interior of the vessel. The one or more manway adapters may be each operably connected to a frame assembly through the second actuator. The first actuator may position the manway adapter horizontally through movement of the frame assembly. The one or more frame assemblies may each comprise a square, rectangular, or box-shaped first frame and a trapezoidal second frame disposed on top of the square, rectangular, or box-shaped first frame. The sides of the square, rectangular, or box-shaped first frame may be configured to moveably engage with the horizontal rails. Further, a portion of the first frame and the entire second frame may extend above the horizontal rail. The top of the second frame may comprise slanting supports connected to the second actuator. The first actuator may be a rotary hydraulic actuator and the second actuator may be a hydraulic cylinder. The vessel may be a tank, the tank may be a component of a tanker truck, tanker car, or other vessels of similar structure, and the tank may contain an oilfield fluid.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Figure 1:
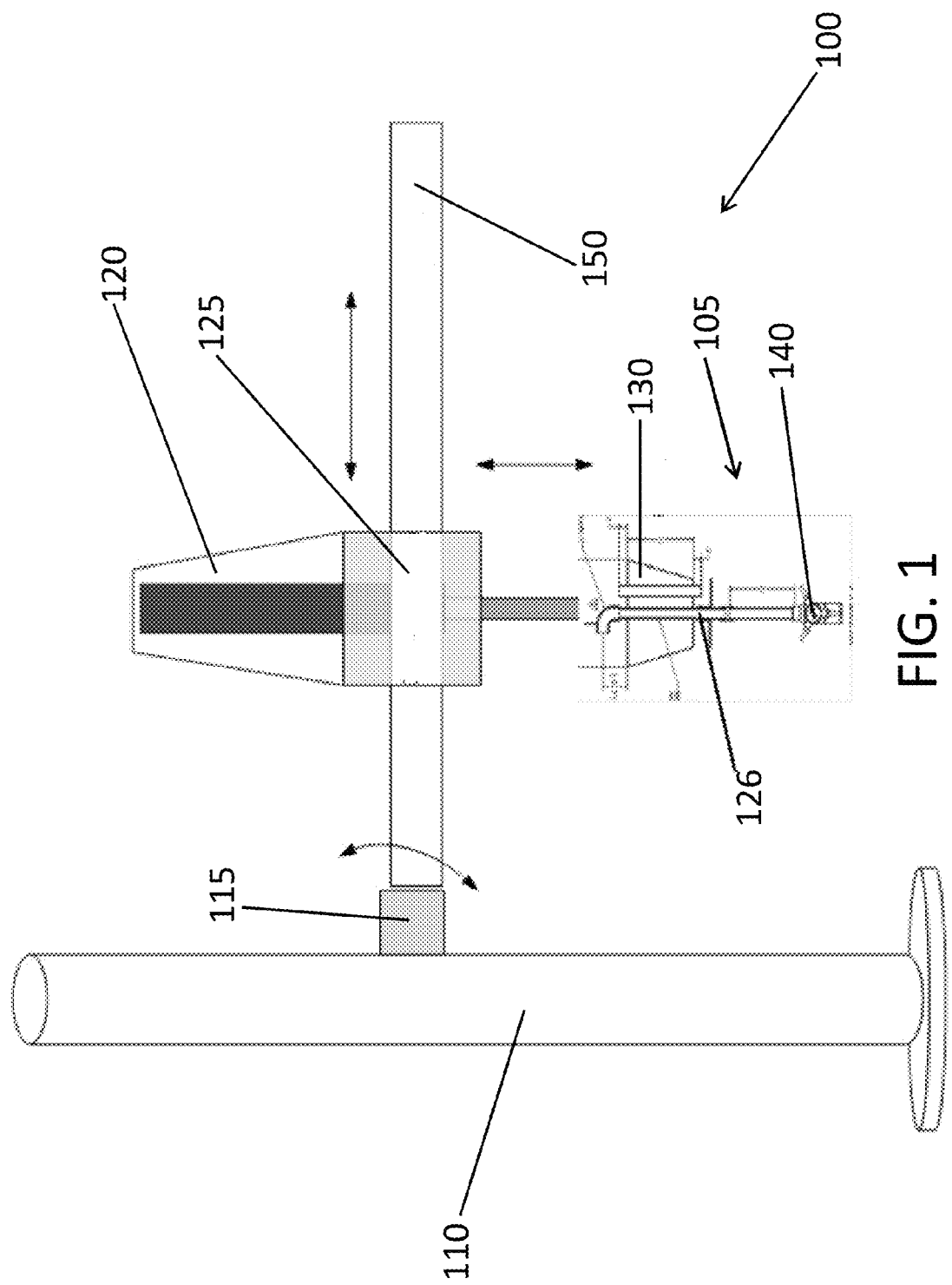
FIG. 1 is a schematic diagram showing a system for cleaning a vessel according to an embodiment of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the invention include a machine-controlled system to wash out tanker trucks and other vessels via the top manway access ports. The tanker trucks and other vessels may have oilfield fluids, gasoline, liquid chemicals, food-, dairy- or pharmaceutical-grade liquids, septic waste, or other fluids (e.g., sludge) typically carried in bulk by tankers. Embodiments include one or more machine actuators to position the washout nozzles and one or more structural assemblies or adapters to access one or more tanker manways. In embodiments, the structural assemblies may be mounted on a basket and rail system to allow for better alignment within the manways. The basket and rail system may be further mounted on a support structure which can be overhead mounted (similar to an overhead crane) or post mounted. In embodiments, the machine controlled system may be used to clean vessels such as tanker trucks, tanker cars on trains, or other vessels of similar structure.

In embodiments, components of the system include one or more manway adapters configured with a washout nozzle. In an illustrative embodiment, each manway adapter may comprise a conical base that is tapered for a secure fit inside the manways of a tanker truck or similar vessel, such as a manway adapter disclosed in U.S. Pat. No. 4,941,493. The manway adapter may include a solution feeding pipe which passes through adapter in an axial direction through the top and bottom. The feeding pipe can terminate in a washout nozzle configured to spray a washing solution in multiple directions, such as a washout nozzle disclosed in U.S. Pat. No. 4,106,950. Other manyway adapters and washout nozzles that can be used include devices described in U.S. Pat. Nos. 5,058,612; 2,116,935; 2,858,836; 6,321,754; 3,556,407; and 5,896,871; International Patent Application Publication Nos. WO 1995/022415; WO 1997/000142; and WO 1994/017922; European Patent No. EP 1437184; and US Published Patent Application Nos. US 2010/0154828; 2013/0160989; and 2013/0247939, for example.

In an exemplary embodiment, the washout nozzle is a water powered device manufactured by GAMAJET under the trade names GAMAJET IV, GAMAJET EZ-8 AND GAMAJET 88 (see U.S. Pat. No. 8,133,328 B2) that rotates and spins 360° to guarantee complete coverage within the tanker. However, other types of washout nozzles known in the art can be used. Similarly, the manway adapter may be a device manufactured by GAMAJET that may be provided with the washout nozzle, or may be other types of manway adapters configured to fit particular designs or styles of manway adapters on particular tanker trucks. In embodiments, the system is designed so that the specific manway adapters and washout nozzles are interchangeable on the frame assembly to provide for custom fitting for particular tanker trucks.

In one embodiment, the washout nozzle is capable of spraying a washing solution in a 360° spray pattern. A particularly advantageous feature of embodiments of the invention is that the system may be capable of moving the manway adapter in a horizontal or vertical direction. In embodiments, this is achieved by hydraulic (e.g., cylinder or fluid motors), pneumatic (e.g., vacuum or compressed air motors), mechanical (e.g., a rack and pinion system) and/or electric actuators (e.g., motors) that position the manway adapter up or down or left and right (or forward or backward). In an exemplary embodiment, the system uses hydraulic actuators to move the washout nozzles up and down, and left and right (or forward or backward) along the rails for proper alignment into the manways. In this embodiment, a hydraulic cylinder controls up and down motion of the manway adapter and a rotary hydraulic actuator controls left and right (or backward and forward) motion of the manway adapter (or frame assembly) horizontally along the rails. In embodiments, the hydraulic cylinder may be any type of hydraulic cylinder including a telescopic cylinder, a plunger cylinder, or a differential cylinder. The hydraulic cylinder is operably connected to the manway adapter and configured for vertical movement (i.e., up or down).

In an embodiment, horizontal and vertical movement is achieved via one or more frame assemblies (otherwise referred to as a basket) coupled to at least one rail system that supports the hydraulic cylinder, manway adapter and washout nozzle.

In a particular aspect, the system comprises a single frame assembly. In another aspect, the system comprises at least two frame assemblies (e.g., as in two frame assemblies, three frame assemblies, four frame assemblies, five frame assemblies, and so on). The one or more frame assemblies may be any shape so long as the one or more frame assemblies can move horizontally along the rail system. In one aspect, the one or more frame assemblies is a polygonal frame assembly. In another aspect the one or more frame assemblies is a non-polygonal frame assembly. In still another aspect, the system comprises more than one frame assembly, wherein the frame assemblies are different (e.g., at least one frame assembly is polygonal and at least one frame assembly is non-polygonal). In still yet another aspect, the system comprises more than one frame assembly, wherein the frame assemblies are the same (e.g., all of the frame assemblies are polygonal frame assemblies or all of the frame assemblies are non-polygonal frame assemblies).

In particular embodiments, the frame assembly may comprise a square, rectangular, or box-like frame, a tapered portion on top of the square or rectangular frame forming a trapezoidal shape on at least one side, and a top portion. Typical dimensions of the frame assembly may be in the range of three to five feet by three to five feet. The frame assembly may be moveably or slideably connected to the rails along the sides of the box-like frame of the frame assembly through wheels or casters. Alternatively, the frame assembly may move along the rails through other mechanisms known in the art, such as a moveable chain, rack and pinion, or conveyor attached to the rails. Further, the frame assembly may extend above the rails, including a top portion of the box-like portion and the entire tapered portion. The top of the frame assembly may have supports or braces extending upward which supports assembly of hydraulic cylinder. Further, movement of the frame assembly along the rails may be controlled by the rotary hydraulic actuator.

The rails may take any configuration that facilitates alignment of the manway adapters with the manways. A typical oil tanker semi-trailer meeting International Organization for Standardization (ISO) standards has a length of 42.64 feet, a width of 8.2 feet and a depth of 12.14 feet, so the rails for this particular application should be configured to account for these dimensions as well as variations and typical spacing between the manways. Typical dimensions and spacing of the rails can range from two to four feet wide by eight to twelve feet long, while typical spacing of manways is six to twelve feet. In one embodiment, the rails are configured longitudinally so that the manway adapters may be positioned along the length of a tanker truck or other vessel. The rails may typically be disposed approximately parallel to and about ten to fifteen feet above the surface of the ground. In other embodiments, multiple sets of rails may be positioned so that the manway adapters may be positioned from the side of a tanker truck. The multiple sets of rails may be spaced at distances that allow access to each of the manways of a tanker truck. Additionally, the rails may be configured with some degree of lateral movement to provide for an additional dimension of positioning. In one embodiment, the rails provide for anywhere from 0° to +/−45° of lateral movement to allow positioning of the manways along the length of the tanker truck. This range of lateral movement facilitates manway adapter alignment in cases where the spacing between manway adapters varies. Other embodiments may allow sets of rails that provide for both lengthwise and sideways positioning of the manway adapters to provide for both longitudinal and lateral alignment. Further, the system may include markings or guideways on pavement and/or guideposts to position the tanker trucks for initial alignment of the manways with the basket and rail structure. Configurations of the system may provide for alignment of anywhere from one to ten manway adapters for positioning in the manways.

The sets of rails may be configured in pairs so that the frame assemblies may slideably engage with the rails on the sides. The pair of rails may be spaced form one another at a distance that allows for engagement with the frame assemblies. However, other configurations are possible, including a monorail, three rails, four rails, or more. The rails may be attached to a support structure which may be overhead mounted or post mounted. The support structure may take the form of metal or concrete columns or posts or metal scaffolding or combination of these. Alternatively, the supporting structure may be a building or garage or parts thereof such as walls or beams, or an overhead structure similar to an overhead crane. The support structure can take any form that provides for suspension of the rails.

Embodiments of the invention also include a process for cleaning a vessel using a system of the invention. The process may comprise providing a system of the invention in a facility for cleaning tanker trucks and other vessels. The process may include providing a vessel having one or more manways on top of the vessel such that the vessel enters the facility and parks or is stationed under the system. Further, the process may include controlling horizontal movement of at least one of the manway adapters with the first actuator and vertical movement of the manway adapter with the second actuator to align the manway adapter within one of the manways of the vessel and delivering a cleaning solution through the washout nozzle to clean out the vessel. When the interior of the vessel is cleaned, the first actuator and second actuator may be used to retract the manway adapter from the tanker truck or other vessel so that it may move away from the system and exit the facility. When another vessel enters the facility, the process may be repeated.

FIG. 1 shows an embodiment of a system 100 according to the invention. System 100 comprises one or more support structures 110 to support rail system 150. Rail system 150 supports frame assembly 125. Manway adapter 105 extends from frame assembly 125, which is connected to and supported by rail system 150. Vertical movement of manway adapter 105 is controlled by hydraulic cylinder 120, which extends above frame assembly 125. Complete horizontal coverage of the system is controlled by: 1) rotary actuator 115 and 2) the casters which ride on frame assembly 125. Rotary actuator 115 is in operable communication with frame assembly 125 and rail system 150, or multiple actuators can be used. As shown by the arrows in FIG. 1, rotary actuator 115 serves to move rail system 150 in a direction that pivots around support structure 110. In this manner, rotary actuator 115 moves rail system 150 back and forth (or with respect to FIG. 1, in and out of the page) to position rail system 150 in any position within the horizontal plane within which it is disposed. Rotary actuator 115 also serves to move frame assembly 125 in toward the support structure 110 and out away from the support structure 110 (or with respect to FIG. 1, left and right on the page). This configuration allows for manway adapter 105 to be moved horizontally due to the positioning of rail system 150 and frame assembly 125 using rotary actuator 115. Also shown in FIG. 1 are manway adapter 130, solution feeding pipe 126, and washout nozzle 140.

Figure 2:
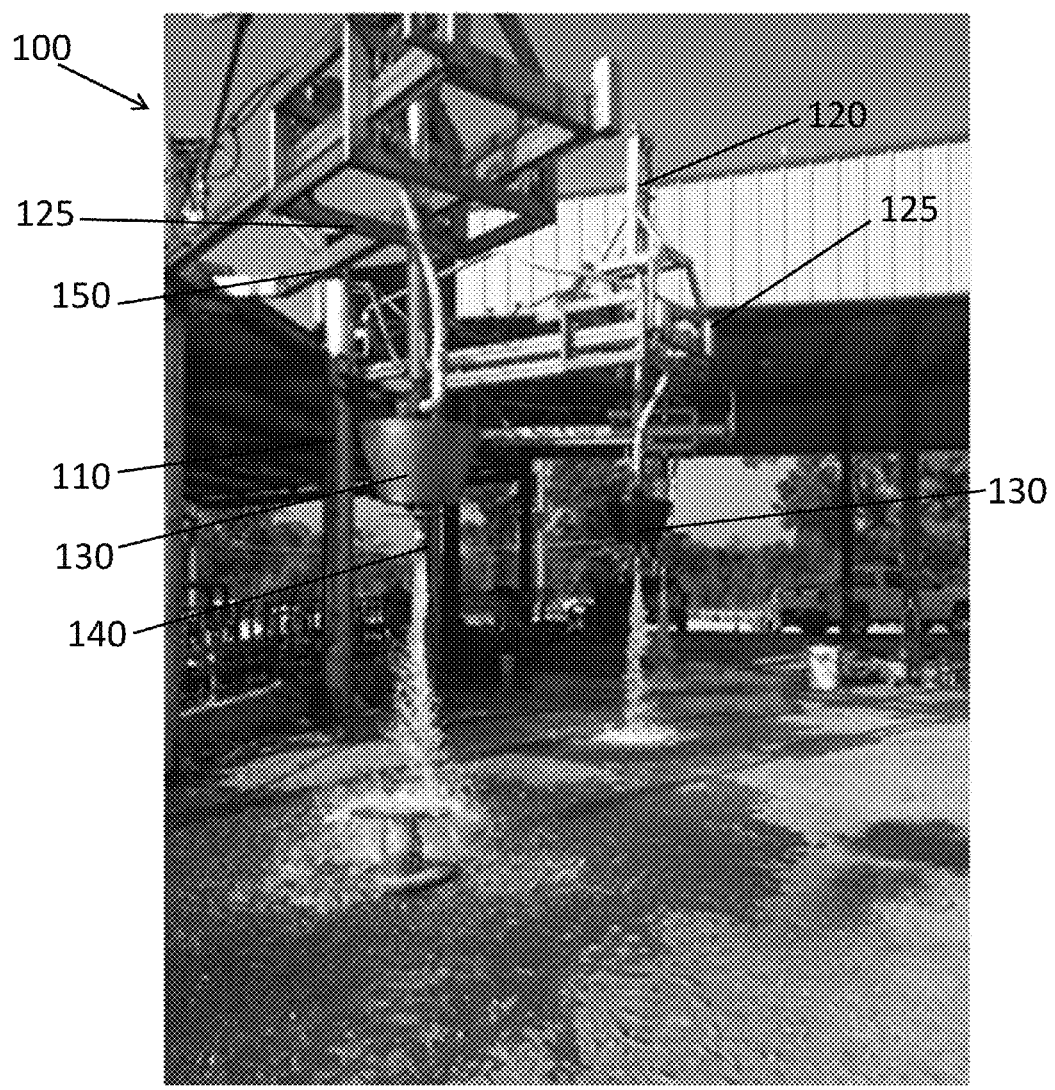
FIG. 2 is a photograph showing a front, oblique view of a system for cleaning a vessel according to an embodiment of the invention.
Figure 3:
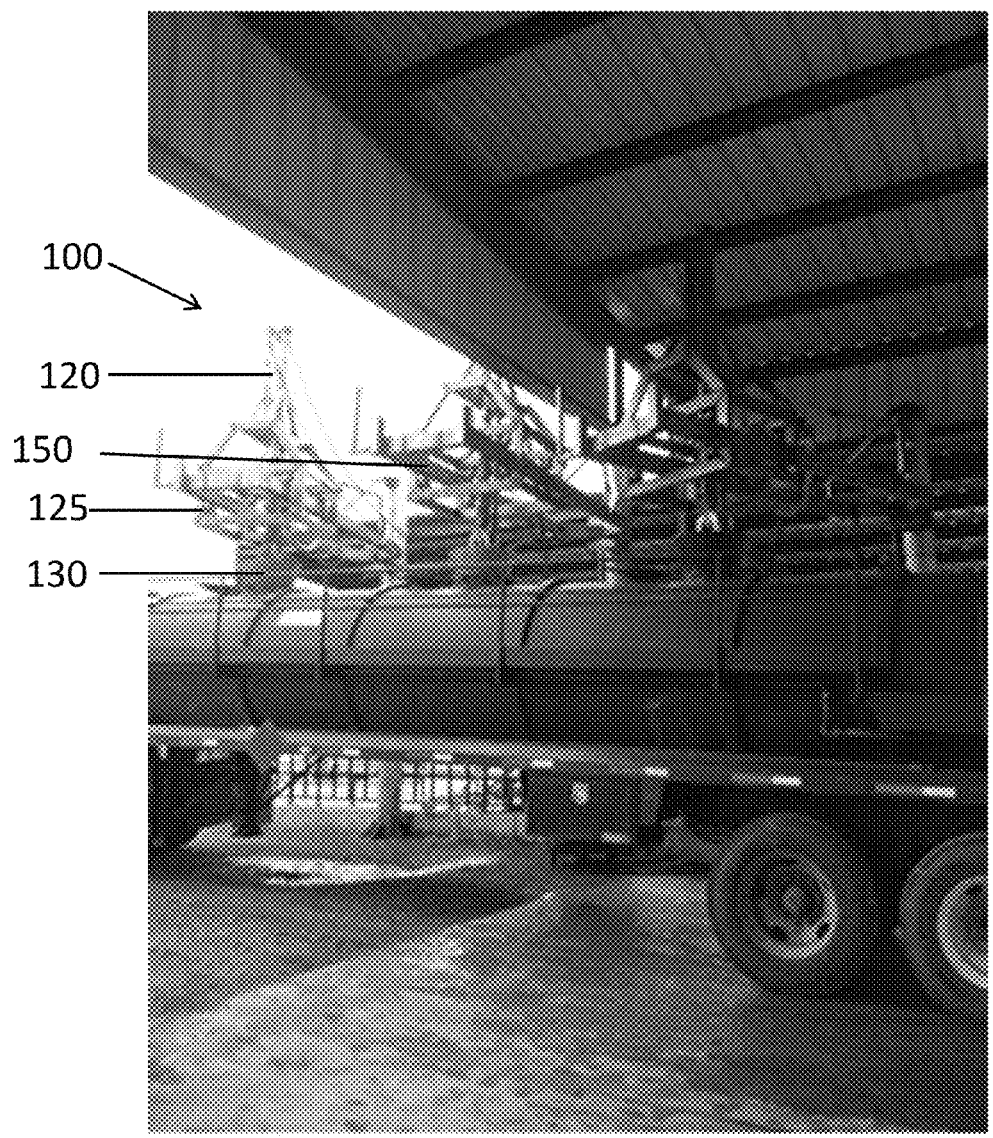
FIG. 3 is a photograph showing a side view of a system for cleaning a vessel during use according to an embodiment of the invention.
Figure 4:
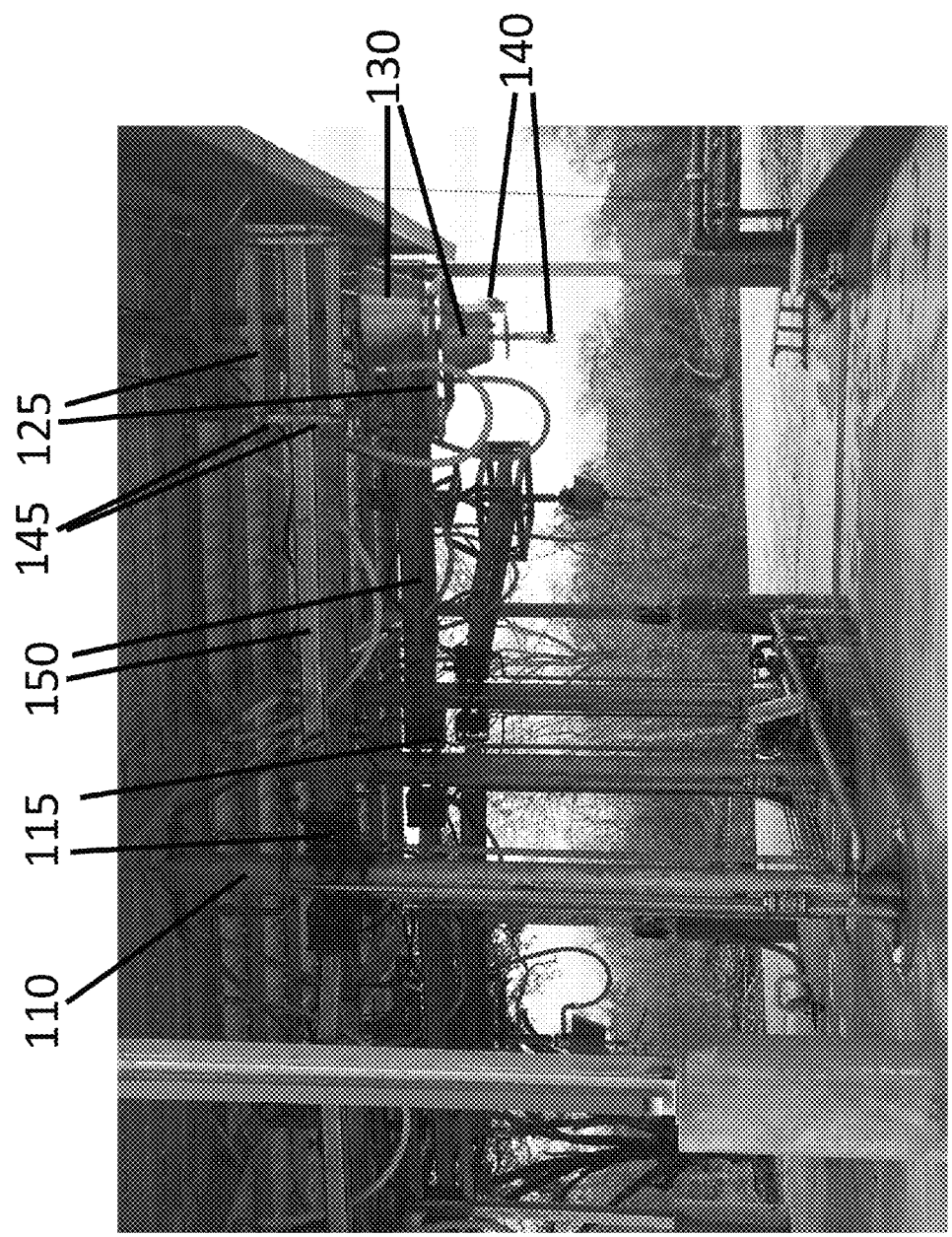
FIG. 4 is photograph showing a front view of a system for cleaning a vessel according to an embodiment of the invention.

FIGS. 2-4 are photographs showing embodiments of the same system 100, with FIG. 3 showing the system 100 in use. FIGS. 2-4 show additional structure of the frame assemblies 125, which may comprise a metallic frame with a bottom square, rectangular, or box-like portion and top tapered or trapezoidal portion. The bottom portion may be a box-shaped frame which serves as a base supporting the top portion which has sides that are disposed at an acute angle toward the apex of the frame assembly. The top of the frame assembly may have additional frame members which extend from the top at an acute angle and support hydraulic cylinder 120 on either side. Further, hydraulic cylinder 120 may have hoses attached providing input and output of hydraulic fluid. The bottom of hydraulic cylinder 120 is attached to manway adapter 130 and washout nozzle assembly 140. Two sides of the bottom box-like portion of frame assembly 125 are slideably engaged with track members through wheels or casters to provide for horizontal movement along track assembly 150. The top portion of the bottom box-like portion of frame assembly 125 and the entire top trapezoidal portion of frame assembly 125 may extend above track members 150. The trapezoidal portion of frame assembly 125 may have two trapezoidal sides that face track members 150 longitudinally on opposite sides and two square or rectangular sides. Hydraulic cylinder 120 may extend through frame assembly 125 from the top portion of frame assembly 125 and may extend below the lower portion of the frame assembly 125 to manway adapter 130. A rotary actuator provides force for moving frame assembly 125 along the track members and for moving rail system 150 around support structure 110. The rotary actuator engages with the frame assembly to move the frame assembly horizontally along the rail.

As shown, the manway adapter 130 that may be used in the system of the invention can generally comprise an approximate cone-shaped plug. The top surface can have a diameter greater than the diameter of the bottom surface. The top and bottom surfaces are connected by a tapered portion extending between them such that a cross-section of the cone-shaped plug has the appearance of an inverted trapezoid. With this cone-shaped plug, the adapter is tapered to fit in and plug a manway of a vessel. Also included are at least one solution feeding pipe which passes through the cone-shaped plug in an axial direction passing first through the top surface and then the bottom surface. Solution feeding pipe terminates in washout nozzle 140 that is water powered and rotates and spins 360° to guarantee complete coverage of the interior of the vessel, such as a tanker. The cone-shaped plug can have a vent pipe passing through it on one side such as in parallel to the solution feeding pipe. The solution feeding pipe is assembled through an optional down pipe, using threaded portions and set screw. The threaded portions may conform to National Pipe Thread (NPT) standards. The manway adapter can also include a splash plate surrounding the solution feeding pipe, such as in parallel with the bottom surface of the cone. The solution feeding pipe can include an elbow portion at the top and a grab handle, such as extending through the elbow portion.

The washout nozzle 140 that can be used in the system of the invention can for example be manufactured by GAMA-JET. Washout nozzle 140 can include a cylindrical main body, and a circular portion on the side of the main body configured for 360° rotation, and spouts extending radially outward from the circular portion.

This is just one example of manway adapters and washout nozzles that can be used as a component of the system. Alternatively, or in addition, the invention contemplates that other manway adapters and/or washout nozzle configurations may be used in the system of the invention. In embodiments, the manway adapters and washout nozzles are interchangeable in the system of the invention.

Additionally, FIG. 4 shows a front view of an embodiment of a system according to the invention. Rotary actuator 115 is shown positioned at end of track assembly 150 where it meets support structure 110. Also shown in FIG. 4 are wheels 145 for moving frame assembly 125 on track assembly 150. Like FIG. 3, FIG. 4 shows that three sets of track assemblies 150, manway adapters 130, and other system components make up a cleaning station for a tanker truck. However, other embodiments may include anywhere from one to five track assemblies and other system components.

Components of the system may be made of any strong metallurgical material such as stainless steel or aluminum. Further, the cleaning solution may be brine water, a solution containing surfactants, and the like.

The system may be controlled through a controller interface (not shown) which has switches or other controls for controlling the actuators and fluid output of the manway adapters. The controller may be operated through a wired or portable wireless connection by an on-site human operator who aligns the manway adapters through visual alignment. The controller may be at a fixed position or portable. Alternatively, the system may be completely automated such that a human operator is not needed. In this embodiment, the frame assembly may be equipped with sensors such as one or more camera sensors or other computer vision equipment or short range proximity sensors such as ultrasonic or infrared sensors for aligning the manway adapter with the manway. Further, the top of the tank may be equipped with one or more targets for interacting with the sensors during alignment. The sensors may be operably connected to a processor that is further connected to the actuators. The processor may be connected to a computer readable memory that has a set of instructions or algorithms stored on it for interpreting data from the sensors and controlling the actuators to align the manway adapter with the manway.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well.

The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A process for cleaning a vessel, comprising:
providing a support structure;
providing one or more rails operably connected to the support structure;
providing a frame assembly supported by and slideably engaged with the one or more rails;
providing one or more manway adapters each equipped with a washout nozzle and supported by the frame assembly;
providing at least one first actuator;
providing at least one second actuator;
controlling horizontal movement of the frame assembly along the one or more rails with the at least one first actuator to position the one or more manway adapters horizontally along the one or more rails;
controlling vertical movement of the one or more manway adapters with the at least one second actuator to position the one or more manway adapters vertically relative to a manway of a vessel;
controlling horizontal movement of the one or more rails with the at least one first actuator to pivot the one or more rails around the support structure such that the one or more rails rotate within a horizontal plane; and
cleaning an interior of the vessel by delivering a cleaning solution through the washout nozzle.

2. The process of claim 1, wherein the vessel is a component of a tanker truck, tanker car, or frac tank.

3. The process of claim 1, further comprising retracting the one or more manway adapters from the manway of the vessel by way of the at least one first actuator and/or the at least one second actuator.

4. The process of claim 1, wherein the at least one first actuator and the at least one second actuator are controlled via a wireless operator station.

5. A process for cleaning a vessel, comprising:
(i) providing a system comprising:
a support structure;
one or more horizontal rails operably connected to the support structure;
one or more frame assemblies supported by and configured for moveable engagement with the rails;
one or more manway adapters configured to fit in a manway of a vessel and to deliver a cleaning solution to one or more interior surfaces of the vessel, wherein each of the manway adapters is operably connected to one of the frame assemblies and connected to a washout nozzle;
one or more first actuators operably configured for positioning at least one of the manway adapters horizontally along the rails; and
one or more second actuators operably configured for positioning at least one of the manway adapters vertically;
(ii) controlling horizontal movement of the frame assembly along the one or more horizontal rails with the one or more first actuators to position the one or more manway adapters horizontally along the one or more horizontal rails to align with a manway of a vessel;
(iii) controlling vertical movement of the one or more manway adapters with the one or more second actuators to position the one or more manway adapters vertically within the manway of the vessel;
(iv) controlling horizontal movement of the one or more horizontal rails with the one or more first actuators to pivot the one or more rails around the support structure such that the one or more rails rotates within a horizontal plane; and
(v) cleaning an interior of the vessel by delivering a cleaning solution through the washout nozzle of the one or more manway adapters to the interior of the vessel.

6. The process of claim 5, wherein the one or more frame assemblies each comprise:
a first frame;
a second frame disposed on top of the first frame;
wherein the first frame is configured to moveably engage with the one or more horizontal rails;
wherein a portion of the first frame and the second frame are disposed above the one or more horizontal rails.

7. The process of claim 5, wherein the one or more first actuators comprises rotary hydraulic actuators.

8. The process of claim 5, wherein the one or more second actuators are hydraulic cylinders.

9. The process of claim 5, wherein the vessel is a tanker truck, tanker car, or frac tank.

10. The process of claim 5, wherein the washout nozzle delivers the cleaning solution in a 360° spray pattern.

11. The process of claim 5, wherein the one or more frame assemblies are moveably connected to the one or more horizontal rails through wheels or casters.

12. The process of claim 5, further comprising moving the one or more horizontal rails laterally up to 45 degrees to allow positioning of the one or more manway adapters along the length of the vessel.

13. The process of claim 5, further comprising retracting the one or more manway adapters from the vessel by way of the one or more first actuators and/or the one or more second actuators.

14. The process of claim 5, wherein the one or more first actuators and the one or more second actuators are actuated via a wireless operator station.

15. The process of claim 5, wherein the support structure comprises an overhead mounted support structure or a post mounted support structure.

16. The process of claim 6, wherein the top of the second frame comprises slanting supports connected to the one or more second actuators.

* * * * *